United States Patent
Yi

(10) Patent No.: US 8,941,794 B2
(45) Date of Patent: Jan. 27, 2015

(54) BACKLIGHT ASSEMBLY AND LIQUID CRYSTAL DISPLAY DEVICE INCLUDING THE SAME COMPRISING A SHIELDING TAPE THAT COMPRISES A PORTION HAVING AN ATTACHED ADHESIVE AND A PORTION WITHOUT THE ADHESIVE

(75) Inventor: Sang-Min Yi, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 880 days.

(21) Appl. No.: 12/760,325

(22) Filed: Apr. 14, 2010

(65) Prior Publication Data

US 2011/0134355 A1 Jun. 9, 2011

(30) Foreign Application Priority Data

Dec. 7, 2009 (KR) .......................... 10-2009-0120709

(51) Int. Cl.
*G02F 1/1335* (2006.01)
*G02F 1/1333* (2006.01)
*G09F 13/04* (2006.01)

(52) U.S. Cl.
CPC .... *G02F 1/133512* (2013.01); *G02F 1/133608* (2013.01); *G02F 2001/133317* (2013.01); *G02F 2001/133388* (2013.01); *G02F 2201/54* (2013.01)
USPC .............................. 349/61; 349/110; 362/97.2

(58) Field of Classification Search
USPC ............. 349/110–111, 61–65; 362/97.1–97.4
See application file for complete search history.

(56) References Cited

U.S. PATENT DOCUMENTS

| | | | |
|---|---|---|---|
| 2007/0019127 A1* | 1/2007 | Oohira | 349/58 |
| 2008/0111950 A1* | 5/2008 | Hong | 349/65 |
| 2008/0180599 A1* | 7/2008 | Ha et al. | 349/64 |
| 2009/0002598 A1* | 1/2009 | Choo et al. | 349/62 |
| 2009/0079904 A1* | 3/2009 | Yada et al. | 349/60 |
| 2009/0189839 A1 | 7/2009 | Ko et al. | |
| 2010/0118229 A1* | 5/2010 | Kim | 349/64 |

FOREIGN PATENT DOCUMENTS

| | | |
|---|---|---|
| KR | 10-0294688 B1 | 4/2001 |
| KR | 10-2008-0058911 A | 6/2008 |
| KR | 1020060133126 * | 6/2008 |
| KR | 10-2009-0053681 A | 5/2009 |
| KR | 10-2009-0082751 A | 7/2009 |

OTHER PUBLICATIONS

Korean Office Action dated Mar. 28, 2011 for Korean Patent Application No. KR 10-2009-0120709 which corresponds to the captioned application.

* cited by examiner

*Primary Examiner* — Paul Lee
(74) *Attorney, Agent, or Firm* — Knobbe, Martens, Olson & Bear, LLP

(57) ABSTRACT

A backlight assembly and a liquid crystal display device including the backlight assembly are disclosed. In one embodiment, the backlight assembly includes a light guide plate configured to guide light, emitted from a light source, to a liquid crystal display panel and an optical sheet disposed on an upper surface of the light guide plate and configured to diffuse and collimate the light. The backlight assembly further includes a frame configured to support the liquid crystal display panel and the light guide plate and a shielding tape connected to an upper surface of the frame and extending from the frame to one side of the optical sheet.

18 Claims, 2 Drawing Sheets

BACKLIGHT ASSEMBLY AND LIQUID CRYSTAL DISPLAY DEVICE INCLUDING THE SAME COMPRISING A SHIELDING TAPE THAT COMPRISES A PORTION HAVING AN ATTACHED ADHESIVE AND A PORTION WITHOUT THE ADHESIVE

CROSS-REFERENCE TO RELATED APPLICATIONS

This application claims the benefit of Korean Patent Application No. 10-2009-0120709, filed on Dec. 7, 2009, in the Korean Intellectual Property Office, the disclosure of which is incorporated herein in its entirety by reference.

BACKGROUND

1. Field

The present invention relates to a liquid crystal display device, and more particularly, to a backlight assembly for preventing a silicone gate circuit from being damaged and a liquid crystal display device including the backlight assembly.

2. Description of the Related Technology

Liquid crystal display devices are widely used in notebook computers or portable televisions since they are light in weight, have a small size, and consume less power.

Liquid crystal display devices display desired images on a screen by controlling an amount of light that passes according to signals applied to a plurality of control switches arranged in matrix form. Since liquid crystal display devices are not self-light emitting devices, they include backlight units for equally irradiating light onto a liquid crystal display panel as a separate light source.

SUMMARY OF CERTAIN INVENTIVE ASPECTS

One aspect of the present invention is a backlight assembly for preventing light from being directly transferred to an amorphous silicone gate (ASG) circuit and preventing an optical sheet from being curled, and a liquid crystal display device including the backlight assembly.

Another aspect of the present invention is a backlight assembly of a liquid crystal display device including: a light guide plate for guiding light from a light source to a liquid crystal display panel; an optical sheet disposed on the upper surface of the light guide plate and for diffusing and collimating the light; a mold frame for supporting the liquid crystal display panel and the light guide plate; and a shielding tape for contacting the upper surface of the mold frame and extending from the mold frame to one side of the optical sheet.

The shielding tape may be attached to the mold frame by using an adhesive, and a part thereof extending to the one side of the optical sheet overlaps the optical sheet and does not contact the optical sheet.

The shielding tape may extend to the one side of the optical sheet so as to block light that forwards a gate driving circuit disposed on a non-display area of the liquid crystal display panel from the optical sheet.

The gate driving circuit may include an amorphous silicone gate (ASG) circuit.

The optical sheet may include: a diffusion sheet for diffusing light incident from the light guide plate; a prism sheet for collimating light incident from the diffusion sheet; and a protection sheet for protecting the prism sheet.

The optical sheet may include one selected from the group consisting of a brightness enhancement film (BEF), a reflective polarizer (BEF-RP), and a dual brightness enhancement film (DBEF).

The backlight assembly may further include: a reflection sheet disposed on a rear surface of the light guide plate and for reflecting light to the light guide plate.

Another aspect of the present invention is a liquid crystal display device including: a liquid crystal display panel for forming an image; a mold frame for supporting the liquid crystal display panel; and a backlight unit comprising: a light guide plate supported by the mold frame and for guiding light from a light source to the liquid crystal display panel, an optical sheet disposed on the upper surface of the light guide plate and for diffusing and collimating the light; and a shielding tape for contacting the upper surface of the mold frame and extending from the mold frame to one side of the optical sheet.

Another aspect is a backlight assembly of a liquid crystal display device comprising: a light guide plate configured to guide light, emitted from a light source, to a liquid crystal display panel; an optical sheet disposed on an upper surface of the light guide plate and configured to diffuse and collimate the light; a frame configured to support the liquid crystal display panel and the light guide plate; and a shielding tape connected to an upper surface of the frame and extending from the frame to one side of the optical sheet.

The above backlight assembly further comprises an adhesive attaching part of the shielding tape to the frame, wherein the adhesive does not contact the optical sheet. In the above backlight assembly, the shielding tape extends to the one side of the optical sheet so as to prevent light, output from the optical sheet, from reaching a gate driving circuit disposed on a non-display area of the liquid crystal display panel. In the above backlight assembly, the gate driving circuit comprises an amorphous silicone gate (ASG) circuit. In the above backlight assembly, the optical sheet comprises: a diffusion sheet configured to diffuse light output from the light guide plate; a prism sheet configured to collimate light output from the diffusion sheet; and a protection sheet configured to protect the prism sheet.

In the above backlight assembly, the diffusion sheet contacts the light guide plate, and wherein prism sheet is interposed between the diffusion sheet and the protection sheet. In the above backlight assembly, the optical sheet comprises at least one of the following: a brightness enhancement film (BEF), a reflective polarizer (BEF-RP), and a dual brightness enhancement film (DBEF). The above backlight assembly further comprises: a reflection sheet contacting the light guide plate and part of the frame, and configured to reflect light to the light guide plate.

Another aspect is a liquid crystal display device comprising: a liquid crystal display panel configured to display an image; a supporting frame configured to support the liquid crystal display panel; and a backlight unit comprising: a light guide plate configured to guide light, emitted from a light source, to a liquid crystal display panel; an optical sheet disposed on an upper surface of the light guide plate and configured to diffuse and collimate the light; a frame configured to support the liquid crystal display panel and the light guide plate; and a shielding tape connected to an upper surface of the frame and extending from the frame to one side of the optical sheet.

In the above display device, the shielding tape has first and second surfaces opposing each other, wherein the second surface is closer to the liquid crystal display panel than the first surface, and wherein the second surface of the shielding tape contacts the liquid crystal display panel. The above display device further comprises an adhesive attached to i) only part of the first surface of the shielding tape and ii) the supporting frame. In the above display device, part of the first surface of the shielding tape is located directly above the optical sheet such that light output from the optical sheet is blocked by the first surface and does not reach at least part of a non-display area of the liquid crystal display panel.

The above display device further comprises a gate driving circuit disposed on the non-display area of the liquid crystal display panel, wherein the light output from the optical sheet does not reach the gate driving circuit. In the above display device, the gate driving circuit comprises an amorphous silicone gate (ASG) circuit. The above display device further comprising: a reflection sheet contacting the light guide plate and part of the supporting frame, and configured to reflect light to the light guide plate.

Another aspect is a liquid crystal display device comprising: a liquid crystal display (LCD) panel having a display area and a non-display area, wherein the display area is configured to display an image, and wherein the non-display area does not display an image; a light source; a light guide plate configured to guide light, emitted from the light source, to the LCD panel; an optical sheet disposed on an upper surface of the light guide plate and configured to diffuse and collimate the light; and a shielding layer located between the optical sheet and LCD panel and configured to at least partially block light output from the optical sheet such that the output light does not reach the non-display area of the LCD panel.

The above display device further comprises: a gate driving circuit disposed on the non-display area of the LCD panel, wherein the shielding layer comprises first and second surfaces opposing each other, wherein the second surface contacts the LCD panel, and wherein part of the first surface of the shielding layer is located directly above the optical sheet such that light output from the optical sheet is blocked by the first surface and does not reach the gate driving circuit.

In the above display device, the gate driving circuit comprises an amorphous silicone gate (ASG) circuit. The above display device further comprising: a frame configured to support the LCD panel; and an adhesive interposed between and attached to only part of the first surface of the shielding layer. In the above display device, a gap is defined between the optical sheet and the frame, and wherein part of the first surface of the shielding layer is located directly above the gap.

DETAILED DESCRIPTION OF CERTAIN INVENTIVE EMBODIMENTS

Figure 1:
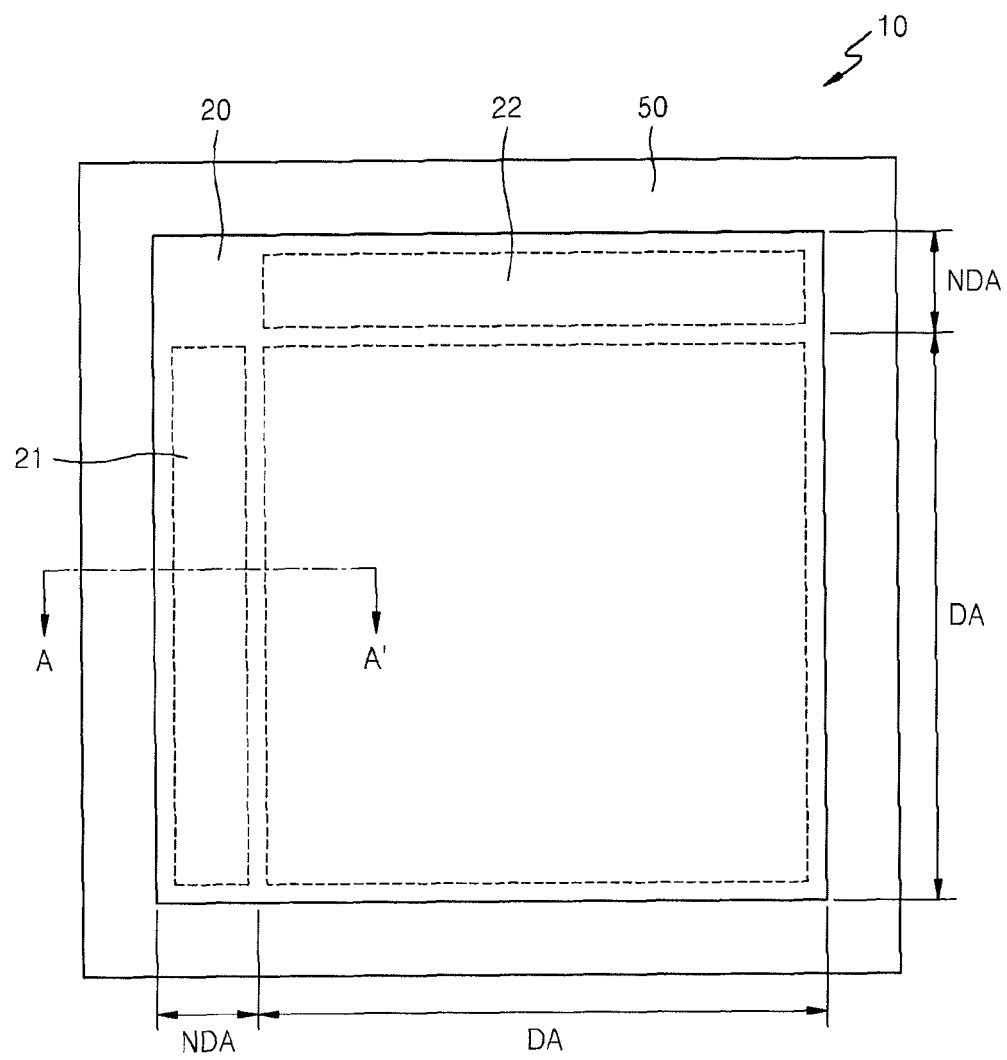
FIG. 1 is a schematic plan view of a liquid crystal display device according to an embodiment of the present invention.

There are edge type backlight units and direct type backlight units. The direct type backlight units include a light emitting lamp disposed on a plane surface, whereas the edge type backlight units include a light emitting lamp disposed on a side surface since they use a light guide plate to diffuse light on entire surfaces. Meanwhile, electron emission type backlight units having a plane surface light emitting structure are recently proposed and consume less power than typical cold cathode fluorescent lamps. Light emitted from backlight units is incident into a liquid crystal display panel, which may affect a driving circuit included in the liquid crystal display panel.

Hereinafter, embodiments of the present invention will be described in detail by explaining exemplary embodiments of the invention with reference to the attached drawings. Like reference numerals in the drawings denote like elements throughout the specification. In the drawings, the thicknesses of layers and regions may be exaggerated for clarity. In addition, unless explicitly described to the contrary, the word "comprise" and variations such as "comprises" or "comprising", will be understood to imply the inclusion of stated elements but not the exclusion of any other elements.

FIG. 1 is a schematic plan view of a liquid crystal display device 10 according to an embodiment of the present invention. Referring to FIG. 1, the liquid crystal display device 10 includes a backlight unit (not shown) supported by a mold frame (a frame or a supporting frame) 50 and a liquid crystal display panel 20.

The liquid crystal display panel 20 forms an image and includes a display area DA and a non-display area NDA. In one embodiment, the display area DA includes i) a plurality of pixel regions that are defined by a plurality of gate lines and data lines that cross one another, ii) a liquid crystal display capacitor LC that controls an amount of light that passes through the liquid crystal display panel 20 according to an image signal for each pixel region, and iii) a thin film transistor T that drives the liquid crystal display capacitor LC. The thin film transistor T is turned on by receiving a driving signal from a gate driving unit 21 of the non-display area NDA. The liquid crystal display capacitor LC receives the image signal from a data driving unit 22 of the non-display area NDA.

The gate driving unit 21 and the data driving unit 22 are included in the non-display area NDA of the liquid crystal display panel 20. The gate driving unit 21 may be two or more according to the size of the liquid crystal display panel 20 and may be included in left and right sides of the liquid crystal display panel 20.

In one embodiment, the gate driving unit 21 has a gate IC less (GIL) structure in which use of a gate driving IC is excluded, and performs an operation of the gate driving IC since an amorphous silicone gate (ASG) circuit is integrated into the liquid crystal display panel 20.

Figure 2:
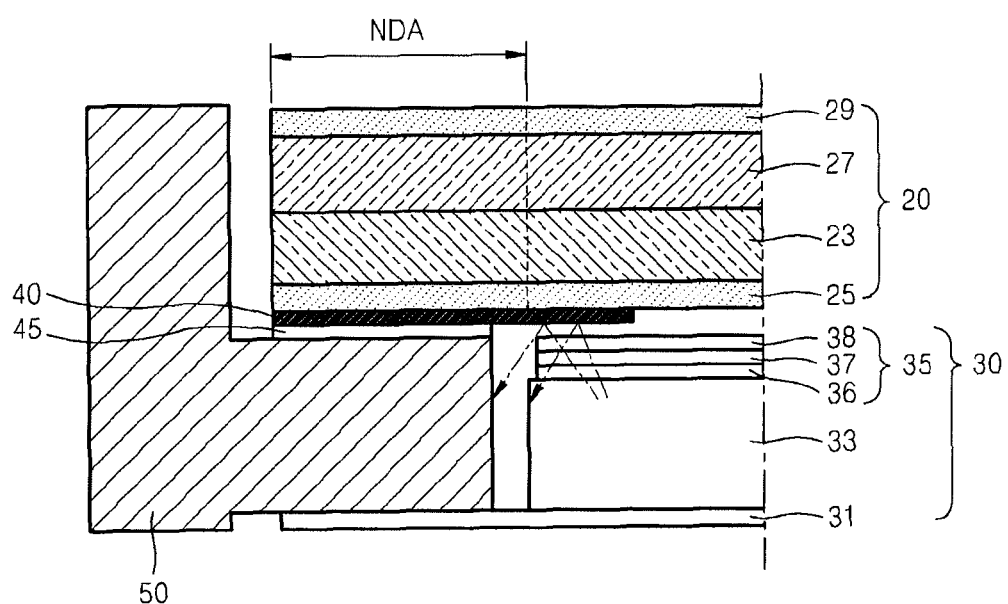
FIG. 2 is a cross-sectional view taken along a line A-A' in FIG. 1.

FIG. 2 is a cross-sectional view taken along a line A-A' in FIG. 1. Referring to FIG. 2, the liquid crystal display device 10 includes the liquid crystal display panel 20, a backlight unit 30, and the mold frame 50.

The liquid crystal display panel 20 includes i) a first substrate 23, ii) a first polarization layer 25 included in a rear surface of the first substrate 23, iii) a second substrate 27, and iv) a second polarization layer 29 included in an upper surface of the second substrate 27.

In one embodiment, the first substrate 23 is a transparent substrate. The first substrate 23 may be formed of a transparent glass material having SiO2 as a main component and may be a transparent plastic material. In one embodiment, a pixel electrode including a thin film transistor (TFT) (not shown) array and an alignment layer are sequentially formed on the display area DA of the upper surface of the first substrate 23. The gate driving unit 21 for driving the TFT array is formed on the non-display area NDA of the upper surface of the first substrate 23. In one embodiment, a driving circuit of the gate driving unit 21 is an ASG circuit.

The first polarization layer 25 is formed on one surface facing the backlight unit 30 of the first substrate 23. In one embodiment, the second substrate 27 is disposed to face the first substrate 23 and is a transparent substrate. The second substrate 27 may be formed of a transparent glass material having SiO2 as a main component and may be a transparent plastic material. In one embodiment, a color filter array, a common electrode, and an alignment layer (not shown) are sequentially formed on the rear surface of the second substrate 27.

The second polarization layer 29 is formed on the upper surface of the second substrate 27. A protection film may be formed on the second polarization layer 29 in order to prevent the second polarization layer 29 from being damaged due to an externally applied force.

A liquid crystal layer and a spacer for partitioning the liquid crystal layer may be formed between the first substrate 23 and the second substrate 27. The first substrate 23 and the second substrate 27 may be sealed by using a sealant, such as a sealing glass fit.

The backlight unit 30 includes i) a light guide plate 33, ii) an optical sheet 35 disposed on the upper portion of the light guide plate 33, and iii) a reflection sheet 31 disposed on the lower portion of the light guide plate 33.

The light guide plate 33 guides light generated from a light source (not shown) of a side surface or a lower surface thereof to the liquid crystal display panel 20 through the optical sheet 35. The light guide plate 33 may be formed of polymethylmethacrylate that is not easily deformed or damaged owing to its high rigidity and has a good transmittance.

The optical sheet 35 includes a diffusion sheet 36, a prism sheet 37, and a protection sheet 38. The diffusion sheet 36 diffuses light received from the upper surface of the light guide plate 33. A plurality of fine dot patterns may be consecutively formed on the surface of the diffusion sheet 36 in order to increasingly diffuse light. The prism sheet 37 is disposed on the diffusion sheet 36, and is used to efficiently use light by changing a path of light and collimating light in a predetermined direction. The optical sheet 35 may include two or more diffusion sheets 36 and prism sheets 37. The protection sheet 38 is disposed on the prism sheet 37 in order to protect the prism sheet 37. The protection sheet 38 may further diffuse light as the diffusion sheet 36 does. The optical sheet 35 may use one selected from the group consisting of a brightness enhancement film (BEF), a reflective polarizer (BEF-RP), and a dual brightness enhancement film (DBEF).

The reflection sheet 31 is disposed on the rear surface of the light guide plate 33, prevents light from leaking to the lower portion of the light guide plate 33, by reflecting light into the light guide plate 33, thereby reducing a light loss, and increasing uniformity.

The mold frame 50 is disposed on the upper portion of the reflection sheet 31 and supports the liquid crystal display panel 20 and the backlight unit 30. The light guide plate 33 is seated in an opening portion of the mold frame 50. In one embodiment, the mold frame 50 has a shape corresponding to the shape of the liquid crystal display panel 20.

A shielding tape (or a shielding layer) 40 is disposed between the mold frame 50 and the liquid crystal display panel 20. The shielding tape 40 extends from the mold frame 50 to one side of the optical sheet 35.

Light output from or guided by the light guide plate 33 forwards the liquid crystal display panel 20 through the optical sheet 35. If the ASG gate driving circuit 21 included in the non-display area NDA of the liquid crystal display panel 20 is directly exposed to light, the intrinsic characteristics of amorphous silicone of the ASG gate driving unit 21 change due to a light reaction, which causes a malfunction or noise in driving the liquid crystal display panel 20. Thus, it is advantageous to block light from the backlight unit 30. In one embodiment, at least a portion of the shielding tape 40 is located directly above the optical sheet 35 as shown in FIG. 2. Therefore, light output from the light guide plate 33 is blocked by the shielding tape 40 and is diffused in an opposite direction of the liquid crystal display panel 20. As shown in FIG. 2, since the shielding tape 40 covers the non-display area (NDA) where the ASG gate circuit 21 is located, the emitted light does not reach the ASG gate circuit 21, thereby preventing the ASG gate driving circuit 21 from being damaged.

In one embodiment, as shown in FIG. 2, an adhesive 45 is attached to part of the shield tape 40 and part of the mold frame 50. In this embodiment, the adhesive 45 is not attached to the optical sheet 35 and the remaining portion of the shielding tape 40. Thus, the shield tape 40 is attached to the mold frame 50 by using the adhesive 45, whereas the protection sheet 38, which is the top layer of the optical sheet 35, contacts neither of the adhesive 45 and shielding tape 40. Further, there is a predetermined first gap formed between the shielding tape 40 and protection sheet 38. Moreover, there is a predetermined second gap formed between i) the mold frame 50 and adhesive tape 45 and ii) the optical sheet 35 and light guide plate 33. In this embodiment, the shielding tape 40 extends from the upper portion of the mold frame 50 to the upper portion of the optical sheet 35 and does not contact the optical sheet 35.

The optical sheet 35 may expand and/or contract when the optical sheet 35 is exposed to a high temperature high moisture environment. This may cause the optical sheet 35 to contact part of the shielding tape 40. When the shielding tape 40 contacts the uppermost layer (here, protection sheet 38) of the optical sheet 35, if the shielding tape 40 does not compensate for a heat expansion of the optical sheet 35, the optical sheet 35 may be curled due to the expansion and contraction of the optical sheet 35. Moreover, even if the shielding tape 40 contacts the protection sheet 38 due to a small gap between the shielding tape 40 and the optical sheet 35, the shielding tape 40 has no adhesion and thus it is possible to minimize the expansion and contraction of the optical sheet 35. In one embodiment, the mold frame 50 is coupled to upper and lower cases (not shown) by using a screw and thus an assembly can be formed.

The liquid crystal display device 10 may be applied to a phone terminal such a PCS phone, a PDA, etc., a small-sized display devices, such as a digital camera, a camcorder, etc., a large-sized display devices, such as a large screen TV, a vehicle display device, etc.

Further, although a TFT-LCD is described in the above embodiment, the present invention is not limited to a liquid crystal display device and may be applied to various light receiving display panels.

According to at least one embodiment of the present invention, a shielding tape is used to block light of a backlight unit that forwards an ASG circuit of a liquid crystal display panel, thereby preventing a malfunction caused by a light response of the ASG circuit.

Further, the shielding tape does not contact an optical sheet, which prevents the optical sheet from being curled, thereby maintaining reliability of the backlight unit.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A backlight assembly of a liquid crystal display device comprising:

a light guide plate configured to guide light, emitted from a light source, to a liquid crystal display panel;

an optical sheet disposed on an upper surface of the light guide plate and configured to diffuse and collimate the light;

a frame configured to support the liquid crystal display panel and the light guide plate;

a shielding tape including a lower surface connected to an upper surface of the frame and extending from the frame to one side of the optical sheet; and an adhesive attaching a portion of the lower surface of the shielding tape to the frame, wherein the adhesive is not attached to the remaining portion of the lower surface of the shielding tape and wherein the shielding tape does not contact any optical sheet.

2. The backlight assembly of claim 1, wherein the shielding tape extends to the one side of the optical sheet so as to prevent light, output from the optical sheet, from reaching a gate driving circuit disposed on a non-display area of the liquid crystal display panel.

3. The backlight assembly of claim 2, wherein the gate driving circuit comprises an amorphous silicone gate (ASG) circuit.

4. The backlight assembly of claim 1, wherein the optical sheet comprises:

a diffusion sheet configured to diffuse light output from the light guide plate;

a prism sheet configured to collimate light output from the diffusion sheet; and a protection sheet configured to protect the prism sheet.

5. The backlight assembly of claim 4, wherein the diffusion sheet contacts the light guide plate, and wherein prism sheet is interposed between the diffusion sheet and the protection sheet.

6. The backlight assembly of claim 1, wherein the optical sheet comprises at least one of the following: a brightness enhancement film (BEF), a reflective polarizer (BEF-RP), and a dual brightness enhancement film (DBEF).

7. The backlight assembly of claim 1, further comprising: a reflection sheet contacting the light guide plate and part of the frame, and configured to reflect light to the light guide plate.

8. A liquid crystal display device comprising:

a liquid crystal display panel configured to display an image; and a backlight unit comprising:

a light guide plate configured to guide light, emitted from a light source, to the liquid crystal display panel;

an optical sheet disposed on an upper surface of the light guide plate and configured to diffuse and collimate the light;

a frame configured to support the liquid crystal display panel and the light guide plate;

a shielding tape connected to an upper surface of the frame and extending from the frame to one side of the optical sheet, wherein the shielding tape has first and second surfaces opposing each other, and wherein the second surface is closer to the liquid crystal display panel than the first surface; and an adhesive attached to i) only part of the first surface of the shielding tape and ii) the frame, wherein the adhesive is not attached to the remaining part of the first surface of the shielding tape and wherein the shielding tape does not contact any optical sheet.

9. The liquid crystal display device of claim 8, wherein the second surface of the shielding tape contacts the liquid crystal display panel.

10. The liquid crystal display device of claim 8, wherein part of the first surface of the shielding tape is located directly above the optical sheet such that light output from the optical sheet is blocked by the first surface and does not reach at least part of a non-display area of the liquid crystal display panel.

11. The liquid crystal display device of claim 10, further comprising a gate driving circuit disposed on the non-display area of the liquid crystal display panel, wherein the light output from the optical sheet does not reach the gate driving circuit.

12. The liquid crystal display device of claim 11, wherein the gate driving circuit comprises an amorphous silicone gate (ASG) circuit.

13. The liquid crystal display device of claim 8, further comprising: a reflection sheet contacting the light guide plate and part of the frame, and configured to reflect light to the light guide plate.

14. A liquid crystal display device comprising:

a liquid crystal display (LCD) panel having a display area and a non-display area, wherein the display area is configured to display an image, and wherein the non-display area does not display an image;

a light source;

a light guide plate configured to guide light, emitted from the light source, to the LCD panel;

an optical sheet disposed on an upper surface of the light guide plate and configured to diffuse and collimate the light;

a shielding layer located between the optical sheet and LCD panel and configured to at least partially block light output from the optical sheet such that the output light does not reach the non-display area of the LCD panel, wherein the shielding layer comprises first and second surfaces opposing each other, and wherein the second surface contacts the LCD panel;

a frame configured to support the LCD panel; and an adhesive interposed between and attached to only part of the first surface of the shielding layer, wherein the adhesive is not attached to the remaining part of the first surface of the shielding layer and wherein the shielding layer does not contact any optical sheet.

15. The liquid crystal display device of claim 14, further comprising: a gate driving circuit disposed on the non-display area of the LCD panel, wherein part of the first surface of the shielding layer is located directly above the optical sheet such that light output from the optical sheet is blocked by the first surface and does not reach the gate driving circuit.

16. The liquid crystal display device of claim 15, wherein the gate driving circuit comprises an amorphous silicone gate (ASG) circuit.

17. The liquid crystal display device of claim 14, wherein a gap is defined between the optical sheet and the shielding layer.

18. The backlight assembly of claim 1, wherein the shielding tape has a first width and wherein the adhesive has a second width that is less than the first width.

* * * * *